United States Patent Office
3,629,338
Patented Dec. 21, 1971

3,629,338
CERTAIN FLUORO-CONTAINING
NITRO-ACETAL COMPOUNDS
Fred E. Martin, Azusa, Calif., assignor to Aerojet-
General Corporation, Azusa, Calif.
No Drawing. Filed July 6, 1964, Ser. No. 381,293
Int. Cl. C07c *43/30*
U.S. Cl. 260—615 A
8 Claims This invention relates to novel fluoro-containing nitroacetal compounds and methods for their preparation. More specifically, this invention relates to an improved method of preparing fluoro-containing nitroacetal compounds.

It is an object of this invention to prepare novel chemical compounds. A further object of this invention is to provide a novel class of acetals which are superior solid rocket plasticizers due to their improved compatibility, stability and energy value. It is another object of this invention to provide a new process for preparing chemical compounds. Still another object of this invention is the provision of a group of acetals possessed of enhanced impact and ballistic properties. These and other objects of the invention will be apparent from the detailed description which follows.

The nitroacetals of this invention have the following generic formula:

(I)
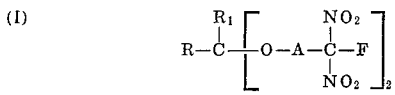

wherein R is a hydrogen or an alkyl radical; $R_1$ is a hydrogen or an alkyl radical; and A is an alkylene radical. Preferably, the alkyl radicals in the foregoing formula are the lower members of the series, i.e., members containing from 1 to about 8 carbon atoms. Most preferably, as can be seen from the examples appearing hereinafter, R and $R_1$ are hydrogen or alkyl from 1 to 4 carbon atoms; and A is alkylene of 1 to 4 carbons.

The novel method of this invention comprises reacting an aldehyde or a ketone with fluoro-dinitroalcohol in accordance with the general reaction scheme set forth below:

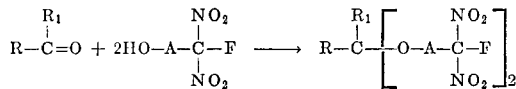

wherein R, $R_1$ and A are as defined above.

It will be apparent that a great number and variety of compounds within the scope of this invention can be prepared by reacting an aldehyde or ketone with a fluoro dinitroalcohol in accordance with the method described herein. Examples of aldehydes and ketones suitable as reactants for my novel methods are: isobutyraldehyde, isopentanaldehyde, 2-methyl butyraldehyde, 2-methyl pentanaldehyde, 3-methyl pentanaldehyde, 2-ethyl enanthaldehyde, 2-isopropyl enanathaldehyde, methyl isopropyl ketone, methyl isobutyl ketone, ethyl isobutyl ketone, ethyl hexylketone, ethyl isohexyl ketone, diisopropyl ketone, dibutyl ketone, diethyl ketone, and methyl octyl ketone. Examples of fluoro-dinitroalcohols suitable as reactants for the method of this invention are: 3-fluoro-3,3-dinitropropanol; 5-difluoro-5,5-dinitro-n-pentanol; 4-fluoro-4,4-dinitro-n-butanol; and 2-fluoro-2,2-dinitroethanol.

It is within the scope of my invention to form the aldehyde or ketone starting material for the above reaction scheme in situ. Thus, a polymer which depolymerizes to yield an appropriate aldehyde or ketone can be added to the system along with a suitable depolymerization catalyst. For example, paraldehyde, a trimer of acetaldehyde, can be depolymerized in situ to furnish acetaldehyde for my novel reaction. Likewise, paraformaldehyde, a polymer of formaldehyde, can be added along with a depolymerization catalyst which causes it to break down and yield formaldehyde in situ. Good yields of the desired acetals are also obtained when the formaldehyde is generated in situ from s-trioxane. Catalysts particularly adaptable for this purpose are catalysts such as sulfuric acid, boron trifluoride, $(BF_3)_1$ ferric chloride, p-toluene sulfonic acid, m-benzene disulfonic acid, zinc chloride, HCl, HF, boron trifluoride complexes etc.

The reaction temperature is not critical to the operability of my novel method, the only significant effect of an increase or decrease in temperature being a corresponding increase or decrease in reaction rate. While reaction temperature is not critical, it is preferred, for reasons of economy of operation and convenience, to employ temperatures within the range from —20° C. to about 50° C. in the practice of this invention.

The process may be carried out at any convenient pressure, normally from 0.1 to about 100 atmospheres. Normally, the reaction is carried out at ordinary atmospheric pressure. The reactants may be employed in varying ratios. However, usually the aldehyde and fluorodinitroalcohol are used in about stoichiometric amounts. The catalysts employed in the reaction are preferably present in an effective catalytic amount of from about 0.1 percent to about 20 percent by weight, based on the total weight of reactants.

The reaction of this invention is preferably conducted in a substantially inert solvent. Any organic solvent known to those skilled in the art, such as benzene, toluene, chloroform, carbon tetrachloride, methylene chloride, ethylene dichloride, etc., is suitable as a medium for the reaction of this invention. Although I prefer to employ an organic solvent as a reaction medium, it is within the scope of my invention to conduct the reaction in any other suitable liquid compatible with the system. For example, an excess of a reactant, such as 3-fluoro-3,3-dinitropropanol, or a liquid catalyst, such as sulfuric acid, which may include small amounts of water, can be so employed.

It is preferable to conduct the reaction of this invention in the presence of a catalyst, especially in the presence of an acid esterification catalyst. The acid esterification catalysts are dehydrating agents which take up the water as it is formed during the reaction. The catalysts mentioned above as suitable for the in situ formation of aldehydes and ketones are likewise suitable for the primary reaction of our invention. Consequently, where in situ depolymerization is to be effected, the same material can be employed to accomplish this and to catalyze my novel reaction. In addition, compounds generally capable of forming alcoholates such as, for example, calcium chloride are suitable catalysts for the reaction of this invention. However, for the highest yields, it has been found that some catalysts are uniquely suited for use in certain reactions. Specifically, it has been found that concentrated sulfuric acid (90 to 99 percent by weight) gives superior yields of formaldehyde, bis-(2-fluoro-2,2-dinitroethyl) acetal.

The fluoro-dinitroalcohol reactants, such as 2-fluoro-2,2-dinitro-ethanol, are preferably prepared by the fluorination of the corresponding dinitroalcohol or salt thereof according to the method described in assignee's copending U.S. patent application Ser. No. 214,169, filed July 27, 1962, now U.S. Pat. No. 3,387,044.

It will be apparent that a great number and variation of acetals within the scope of the invention can be prepared by reacting appropriate starting materials according to the method taught therein. Mixtures of the reactants of my novel method can be employed in the practice of my invention.

It will be apparent that the novel nitroacetals of this invention are either acetals or ketals, depending on the nature of the R and $R_1$ radicals, in the generic formula. However, all of my novel compositions are generically referred to and identified herein as acetals in accordance with the normal practice employed in the literature. This practice is recognized and followed by Chemical Abstracts as noted in Sec. 209 of the nomenclature pamphlet entitled The Naming and Indexing of Chemical Compounds by Chemical Abstracts (1962), available at the Office of Chemical Abstracts, the Ohio State University, Columbus, Ohio.

To contribute to a better understanding of this invention, the following examples are presented. It should be understood, however, that these examples are presented merely as a means of illustration and that the invention is not limited to the particular embodiments and conditions described therein.

EXAMPLE I

Preparation of formaldehyde, bis-(2-fluoro-2,2-dinitroethyl) acetal

A 15.3 g. portion of 2,2-dinitro-2-fluoroethanol in 30.6 ml. of ethylene chloride was charged into a 100-ml., three-necked flask equipped with a magnetic stirrer, thermometer and a drying tube. The reaction mixture was stirred and maintained at 20 to 25° C. while 16.8 ml. of 96 percent sulfuric acid was added during 5 minutes. A 1.5 g. portion of 95 percent paraformaldehyde was added in one portion and the mixture was stirred during 1.68 hours. The sulfuric acid layer was removed and the organic layer was washed 4 times with 15 ml. portions of 1.25 N NaOH, then 4 times with 15 ml. portions of distilled water. The organic layer was filtered, then stripped of volatiles at 50° C. and 5 mm. Hg. Weight of product=11.7 g., $n_D^{25}$ 1.4395. Infrared curve confirmed disappearance of the hydroxyl group and the formation of the ether linkage.

*Analysis.*—Calc'd for $C_5H_6O_{10}N_4F_2$ (percent): C, 18.76; H, 1.89; F, 11.67. Found (percent): C, 19.15; H, 1.98; F, 10.96.

EXAMPLE II

Preparation of methyl-n-butyl ketone, bis-(5-fluoro-5,5-dinitro-1-pentyl) acetal 5-fluoro-5,5-dinitro-1-pentanol (0.5 mole) dissolved in about 300 ml. ethylene chloride is charged into a flask equipped with a stirrer, thermometer, and a drying tube. The reaction mixture is stirred and maintained at 20 to 25° C. while about 60 ml. of concentrated sulfuric acid is added during 15 minutes. Then methyl-n-butyl ketone (0.25 mole) is added and the mixture is stirred about 2.0 hours. The sulfuric acid layer is removed and the organic layer is washed 4 times with 60 ml. portions of 1.25 N NaOH, then 4 times with 60 ml. portions of distilled water. The organic portion is filtered and stripped of volatiles. Infrared curve confirmed disappearance of the hydroxyl group and the formation of the ether linkage.

EXAMPLE III

Preparation of propionaldehyde, bis-(3-fluoro-3,3-dinitropropyl) acetal

One mole of 3-fluoro-3,3-dinitro-1-propanol dissolved in ethylene chloride is placed in a flask equipped with a stirrer, thermometer and a drying tube. The reaction mixture is stirred and maintained at about 20 to 25° C. while about 150 ml. of concentrated sulfuric acid is added during 30 minutes. Then 0.5 mole of propionaldehyde is added and the mixture is stirred for about 3 hours. The sulfuric acid layer is removed and the organic layer is washed 4 times with 100 ml. portions of 1.25 N NaOH, then 4 times with 100 ml. portions of distilled water. The organic portion is filtered and stripped of volatiles. Propionaldehyde, bis-(3-fluoro-3,3-dinitropropyl) acetal is obtained in good yield.

EXAMPLE IV

Preparation of acetaldehyde, bis-(4-fluoro-4,4-dinitrobutyl) acetal

A one mole portion of 4-fluoro-4,4-dinitro-1-butanol in 30.6 ml. of methylene chloride was charged into a flask equipped with a stirrer and thermometer. The reaction mixture was stirred and maintained at 20 to 25° C. while 300 ml. of concentrated sulfuric acid was added during about 50 minutes. A one-half mole portion of acetaldehyde was added in one portion and the mixture was stirred during about 3.0 hours. The sulfuric acid layer was removed and the organic layer was washed 4 times with 100 ml. portions of 1.25 N NaOH, then 4 times with 100 ml. portions of distilled water. The organic portion is filtered, and stripped of volatiles. Infrared curve confirmed disappearance of the hydroxyl group and the formation of the ether linkage. The product recovered represented a high yield of acetaldehyde, bis-(4-fluoro-4,4-dinitrobutyl) acetal.

EXAMPLE V

Preparation of acetaldehyde, bis-(2-fluoro-2,2-dinitroethyl) acetal

A 0.2 mole portion of 2-fluoro-2,2-dinitroethanol in about 30 ml. of ethylene chloride was charged into a flask equipped with a stirrer and thermometer. The reaction mixture was stirred and maintained at 20 to 25° C. while about 12 ml. of boron trifluoride was added during 5 minutes. A 0.1 mole portion of acetaldehyde was added in one portion and the mixture was stirred during about 1.5 hours. The organic material was washed 4 times with 25 ml. portions of 1.25 N NaOH, then 4 times with 25 ml. portions of distilled water. The organic portion is filtered and stripped of volatiles. Infrared curve confirmed disappearance of the hydroxyl group and the formation of the ether linkage. A good yield of acetaldehyde, bis-(2-fluoro-2,2-dinitroethyl) acetal was obtained.

The fluoro-containing nitroacetals prepared by the novel method of this invention are excellent plasticizers for use in the preparation of polyurethane binders for high energy solid rocket propellants such as those disclosed in assignee's copending U.S. patent application Ser. No. 829,180, filed July 20, 1959, now U.S. Pat. No. 3,245,849. The acetals are also suitable as plasticizers for nitrocellulose and nitropolymers such as the nitro-substituted polyurethane polymers disclosed in assignee's copending U.S. patent application Ser. No. 728,491, filed Apr. 14, 1958, now abandoned. The plasticizers prepared as taught herein contribute to the energy of propellants in which they are incorporated, because of their high nitro content, while possessing good chemical and thermal stability. Hence, they are superior to the commercial plasticizers which contain no nitro groups and are, accordingly, substantially nonenergetic. In addition, the fluoro-containing nitroacetals prepared by the method of this invention are compatible with those polyurethane systems in which the monomers contain gem-dinitro or nitraza groups, with which systems most plasticizers commercially available at present are incompatible.

In utilizing my fluoro-containing nitroacetals as plasticizers for nitropolymer polymerization, the nitropolymers can be polymerized in the presence of the plasticizer or the plasticizer can be mixed into the nitropolymer after polymerization thereof. The plasticizers are incorporated into the nitropolymers in amounts preferably within the range from about 10 percent to about 40 percent by weight of the composition. When utilizing the acetals as plasticizers for polyurethanes which contain no nitro groups, such as the polyurethane binders for the solid propellants of the above-mentioned copending U.S. patent application, Ser. No. 829,180, the techniques of incorporating the plasticizer into the binder is essentially the same as that used with nitropolymers. The plasticizers are preferably incorporated in the propellants in amounts up to about 15 percent by weight thereof.

As explained in copending applications Ser. Nos. 728,491, now abandoned, and 829,180, now U.S. Pat. No. 3,245,849, the nitro-substituted polyurethanes of the former and the polyurethane propellants of the latter can be used as a primary propulsion source in rocket-propelled vehicles, and can also be used as a propellant for artillery missiles. When used as the primary propulsion source for rocket vehicles, they can be conveniently ignited by a conventional igniter, as for example, the igniter disclosed in assignee's copending U.S. Pat. No. 3,000,312. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle creating propulsion force.

The preferred plasticizers for use in solid propellants are formaldehyde, bis-(2-fluoro-2,2-dinitroethyl) acetal, and acetaldehyde, bis-(2-fluoro-2,2-dinitroethyl) acetal. It has been found that these compounds blend most readily with the other propellant ingredients.

The nitroacetals of Formula I are unique among acetal compounds in that they possess the ideal combination of properties for a propellant plasticizer, namely, high energy and excellent compatibility with the polyurethane binders, and good chemical and thermal stability.

Having described the invention, it is intended that it be limited only by the lawful scope of the appended claims.

I claim:

1. As compositions of matter, the compounds having the formula:

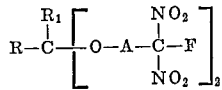

wherein R is a radical selected from the group consisting of hydrogen and lower alkyl; $R_1$ is a radical selected from the group consisting of hydrogen and lower alkyl; and A is a lower alkylene radical.

2. As compositions of matter, the compounds having the formula:

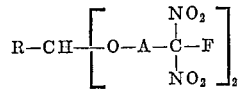

wherein R is a radical selected from the group consisting of hydrogen and lower alkyl, and A is a lower alkylene radical.

3. As compositions of matter, the compounds having the formula:

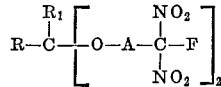

wherein R is lower alkyl radical, $R_1$ is a lower alkyl radical, and A is a lower alkylene radical.

4. As compositions of matter, the compounds having the formula:

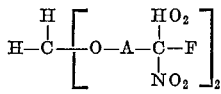

wherein A is a lower alkylene radical.

5. As compositions of matter, the compounds having the formula:

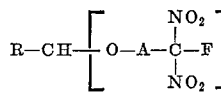

wherein R is a lower alkyl radical, and A is a lower alkylene radical.

6. As a composition of matter, the compounds having the formula:

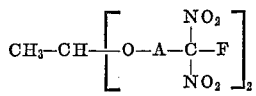

wherein A is a lower alkylene radical.

7. As a composition of matter, formaldehyde, bis-(2-fluoro-2,2-dinitroethyl) acetal.

8. As a composition of matter, acetaldehyde, bis-(2-fluoro-2,2-dinitroethyl) acetal.

References Cited

UNITED STATES PATENTS

| | | | |
|---|---|---|---|
| 2,227,128 | 12/1940 | Ellis | 260—615 A X |
| 2,415,046 | 1/1947 | Senkus | 260—615 A X |
| 3,291,833 | 12/1966 | Gold et al. | 260—615 A X |

FOREIGN PATENTS

| | | | |
|---|---|---|---|
| 635,763 | 1/1962 | Canada | 260—611 |
| 652,628 | 11/1962 | Canada | 260—615 A |
| 928,920 | 6/1963 | Great Britain | 260—615 A |

OTHER REFERENCES

Guccione: Chem. Eng., vol. 70, #7, pp. 62–64, 1963.

LELAND A. SEBASTIAN, Primary Examiner

U.S. Cl. X.R.

149—19, 88